Dec. 9, 1952   J. MOON   2,620,909
HOIST DRUM CONTROL
Filed Nov. 17, 1947   6 Sheets-Sheet 1

INVENTOR.
James Moon
BY Philip Subkow
ATTORNEY.

Dec. 9, 1952  J. MOON  2,620,909
HOIST DRUM CONTROL
Filed Nov. 17, 1947  6 Sheets-Sheet 4

Fig. 7

INVENTOR.
James Moon
BY
Philip Subkow
ATTORNEY

Patented Dec. 9, 1952

2,620,909

UNITED STATES PATENT OFFICE 2,620,909

HOIST DRUM CONTROL

James Moon, Altadena, Calif., assignor to Western Oil Tool & Engineering Co. Inc., Hollydale, Calif., a corporation of California Application November 17, 1947, Serial No. 786,462

3 Claims. (Cl. 192—.098)

This invention relates to a device for controlling the operation of hoist drums, particularly to those hoist drums operated under high load and at high speeds, and particularly those powered by internal combustion engines. In such mechanisms it is highly desirable to have a speed change device connecting the drum and the power plant and also to have a control of the throttle, preferably so combined that at one station the speed change mechanism may be actuated and the throttle actuated. It is most desirable that this control be actuable by the same handle connection or at least at the same station. This is particularly important in connection with oil well drilling equipment wherein the driller operates both the speed change mechanism and the throttle position and is also charged with the duty of controlling the brake action on the hoist drum.

It is therefore highly desirable and it is a feature of my invention to provide a single lever control which actuates the throttle and the speed change mechanism while leaving the other hand free for the actuation of the brake or for other purposes.

It is one of the particularly advantageous features of my invention to provide a means whereby with one lever action I may control the throttle at any position of the speed change mechanism and control the speed change mechanism at any throttle position. This is particularly advantageous where the speed change mechanism consists of air or other fluid clutches which connect the drill hoist to the power plant through various power transmission mechanisms such as gears or sprocket chains. It is thus possible with my device, at any throttle position, to change from a low speed to high speed or reverse, and at any position of the speed change mechanism to advance or retard the throttlue. This flexibility of control from one position is of extreme importance in drilling operations, particularly where the drilling hoist is the hoist drum which is controlled.

These and other objects of my invention will be more fully appreciated by reference to the accompanying drawing and the description thereof which follows hereafter.

Figure 1:
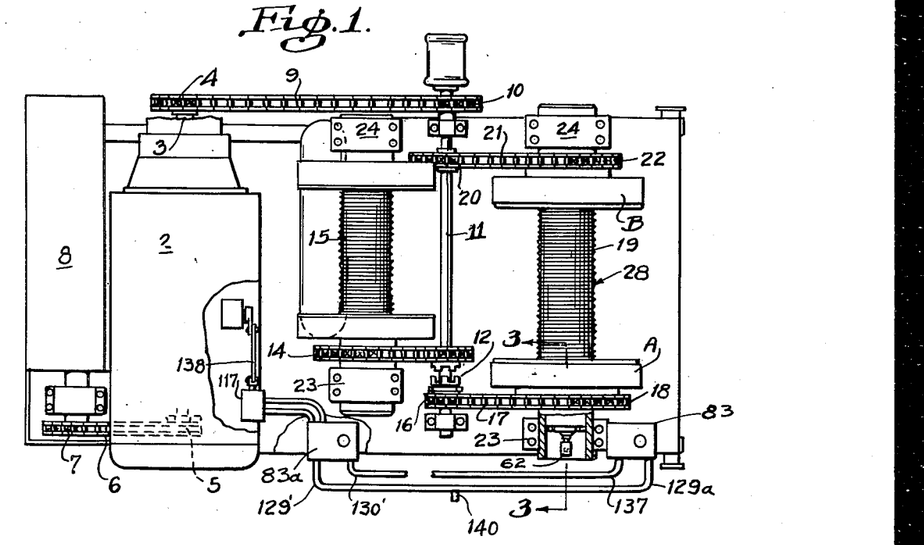
Fig. 1 is a plan view of the hoist and power plant assembly with the cover removed, showing the relative position of the control mechanism.
Figure 2:
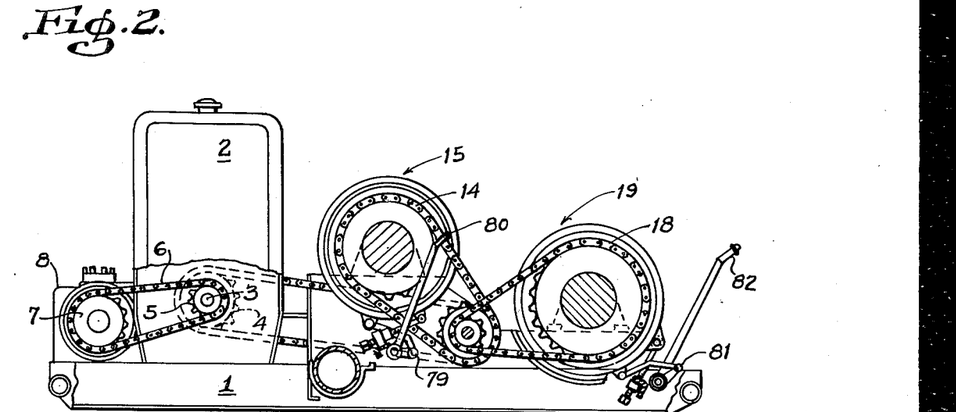
Fig. 2 is a side view of Fig. 1.

The hoist assembly is composed of a frame 1 upon which is mounted a power plant such as an internal combustion engine 2, the main propeller shaft 3 of which has mounted upon it sprockets 4 and 5. Sprocket 5 is connected through sprocket chain 6 to sprocket 7 mounted upon the main shaft of air compressor 8. Sprocket 4 is connected through sprocket chain 9 to a sprocket 10 mounted upon the countershaft 11 mounted in suitable bearings upon main frame 1. The drums 15 and 19 are each mounted upon pillow blocks 23 and 24.

The power is transmitted from the power plant 1 through the chain 9, shaft 11 and through jaw clutch 12 to both chains 21 and 17 through sprockets 20 and 16, respectively. The power is then transmitted through air clutches which engage the sprockets 18, 22, and 14, respectively. Drum 15 which may be used for sand reel operations has a clutch and brake construction similar to that of 19 but only on one end thereof.

Figure 3:
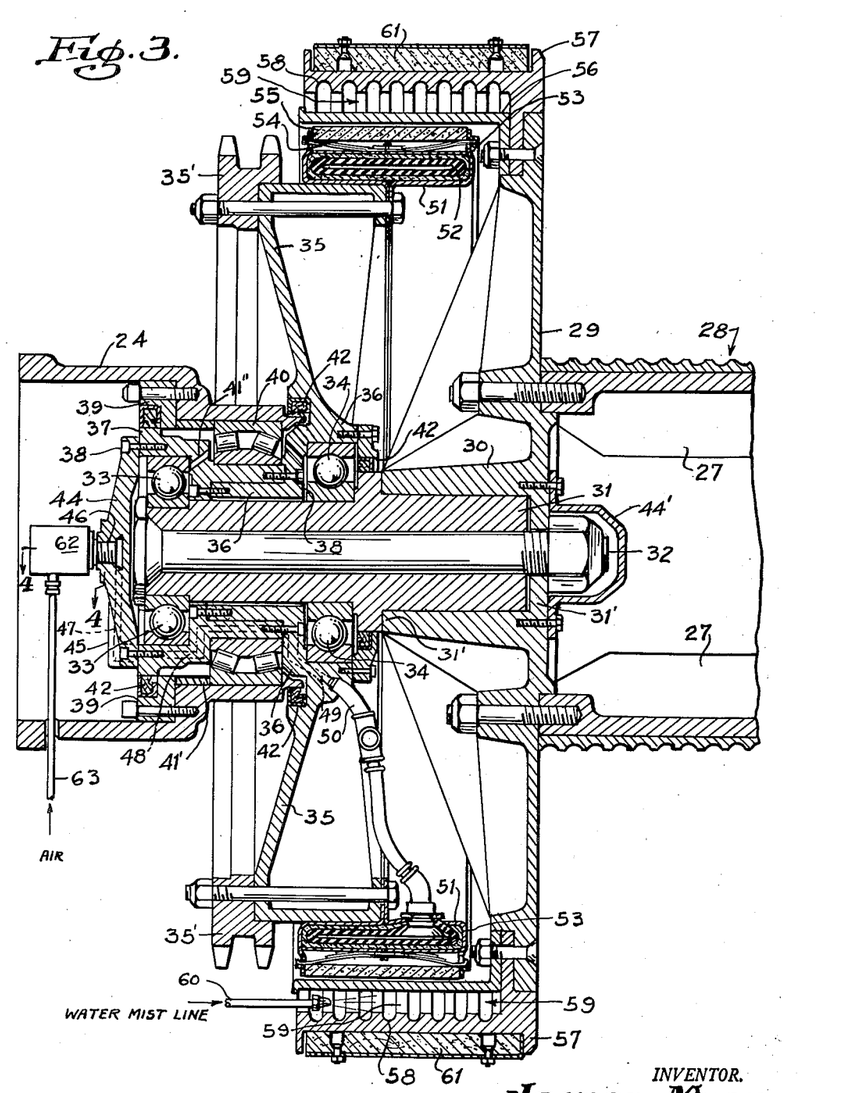
Fig. 3 is a section taken on the line 3—3 of Fig. 1.

The drum 19 carries a groove jacket or spool 28 which has internal longitudinal strengthening ribs 27. The drum 19 is bolted to a flange 28 and to a shaft, bearing and clutch sprocket assembly of like construction at each of the ends A and B of the drum, axially mounted on the shaft. Ends A and B are constructed exactly alike except that the end B carries a sprocket and a clutch of smaller diameter than the end A. When mounted for operation the sprocket of ends A and B are each always connected to the source of motive power and in rotation loads may be instantaneously transferred from end A to end B to drive the drum selectively at two different speeds by merely throwing a valve to transfer the air pressure from one clutch to the other. Since both ends A and B are similarly constructed only the end A will be described.

The spool 28 is bolted to the drum flange 29 which is formed with a hub 30. Positioned in hub 30 is the stub shaft 31 held in place, by the draw bolt 32, against the end of the hub 30 by means of a shoulder 31'. Bearings 33 and 34 are mounted longitudinally spaced on the stub shaft 31. While ball bearings are shown, other types of roller bearings may be employed.

The sprocket disc 35 upon which sprocket 35' is bolted is formed with the hub 36 which is bolted to the stirrup 37 by bolts 38. The bearings 33 and 34 are held in place by the hub 36 and stirrup 37 against shoulders suitably formed in the shaft 31. The hub 36 is spaced from the stub shaft 31 so that the shaft is not in driving or frictional contact at the opposing surfaces of 36 or 37 under any condition of loading.

Mounted exteriorly of the stirrup 37 and retained by shoulders formed in the stirrup 37 and on the sprocket disc 35 is a thrust roller bearing 40. The pillow block 24 is mounted on the bearing 40. The bearing 40 is restrained by ring 41' on one end (A) and not restrained by a ring 41' on the other end. This permits movement due to expansion thereof, imposing no thrust load on 40 as a result of such expansion. Lubrication passageways 41'' are provided connecting the bearings 40, 33, and 34 so that one shot lubrication, through a connection not shown, to the bearing 40 will also lubricate the bearings 33 and 34. Rotary seals 42 are suitably provided. These, in cooperation with the closure 44 mounted at the end of the drum shaft and bearing assembly, act to contain the lubricant.

A bore 46 is formed in the end of the closure 44 and connects with a bore 47 formed in an external rib 45 on the closure 44. The bore 47 connects with a bore 48 in the stirrup 37 and with a bore 49 in the hub 36. To the bore 49 is connected the air hose line 50 of the air-operated clutch to be described below.

Air is admitted under pressure to the bore system by a line 63 passing through the pillow block and connected to the rotary air seal 62 mounted in the bore 46.

The clutch is constructed to be air-operated as follows. A housing 51, coaxial with the shaft, is bolted to the sprocket disc 35. The housing holds an inflatable pneumatic tube 52 on which is positioned a clutch pressure plate 53. A plurality of leaf springs 54 are positioned in uniform spacing around the periphery of the plate 53 and held in place in holes formed in the sides of the housing 51. Upon the springs 54 is mounted a clutch plate 55 having a suitable surface for frictional engagement with the clutch ring 56, which, together with the brake flange 57, is mounted on the drum flange 29. The clutch faces are therefore parallel to and co-axial with the shaft 31. The brake drum flange 57 is grooved at 58 and spaced from the clutch ring 56, so that a circumferential opening 59 is provided into which may be placed a stationary water line 60.

On the exterior surface of the brake flange 57 is mounted a conventional brake block 61 which may be operated by hand or power means in any conventional manner to engage the brake flange for braking purposes.

Upon application of air pressure through 63 the tube 52 expands, thus forcing the split plate 55 to expand and forcing the spring 54 to expand the split clutch plate 55 against the inner face of the plate 56.

The sprocket 35' of the end A is connected to the drum via the clutch and thus to the hub 30 and the shaft 31. Thus shaft 31 and the disc 35 are rotating at the same R. P. M. and the bearings 33 and 34 are stationary. The rotational loads are transferred from the sprocket disc 35 and through the hub 36, stirrup 37, to the pillow block via the bearing 40. The static loads on the drum are transferred to the pillow block 24 via bearings 33 and 34 to the stirrup 37, and via the bearing 40 to the pillow block. The thrust load on the drum is transferred from the draw-bolt through 34, against which it abuts, to 40.

Referring to the condition in end B, the clutch is disengaged so that the end B is in free-wheeling condition, i. e., the sprocket disc 35 of end B is disengaged from the rotating drum. The stub shaft 31 of end B rotates at the R. P. M. of the drum. Since the sprocket at end B is of smaller diameter and when engaged rotates at a higher R. P. M. than that of end A, the sprocket 35, the hub 36, and the stirrup 37 of end B will rotate at a higher R. P. M. than the shaft 31 of end B. Of course, the sprocket may be of the same diameter if driven from different power sources which will drive the sprockets each at the desired speed. The end to be obtained is to drive the end sprockets at different speeds. The bearings 33 and 34 of end B thus rotate and are not stationary as in the case of the same bearings in end A when the end A is driven.

The condition described above also exists in similar manner when the power is applied to end B by clutching at end B and declutching at end A. This can be done almost instantaneously by a valve in line 63 to be described later.

When the drum is free-wheeling, with both ends A and B declutched, as, for example, when a line is being unreeled from the drum, as when a weight is being lowered, the condition described for the free-wheeling end obtains at both ends A and B. The drum speed is controlled by the brake 61. The water mist enters the grooves 58 and is vaporized by the frictional heat to thus cool the brake and clutch ring during clutching to overcome frictional heat developed during slippage.

The drum during free-wheeling at both ends A and B thus rotates at a different speed and in a direction reverse to the direction of rotation of the sprockets at both ends A and B when enclutched. The bearings 33 and 34 rotate and take the rotational loads which are, of course, lighter than the rotational loads exerted when such weight is lifted by application of power to end A or end B with the drum suitably clutch-connected to the driving means.

Figure 4:
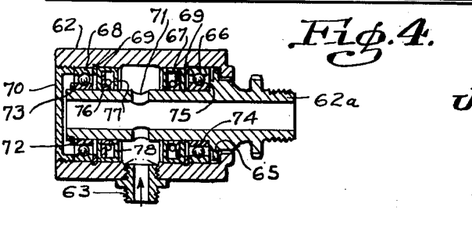
Fig. 4 is a section taken on the line 4—4 of Fig. 3.

The rotor seal 62 is shown in section in Fig. 4. The tube 62a rotates inside the housing 62. The shoulder 64 is spaced from the shoulder 65. The ball race 66 is slidably mounted in 62 against a thrust ring 69. A like ball race 68 is slidably mounted in 62 against a thrust ring 69 and cover 70. The tube 62a has bores 71 for admission of air and carries, by a shrink fit, the ball race 73 retained against a ring 72 mounted on 62a. The ball race 74 is carried by a shrink fit on tube 62a against the shoulder 75. Leather washer 76 or similar packing is mounted in tube 62a by means of springs 77 and operates in housing 78. The packed off area in 62 is small and the peripheral speed of the packed off surface of 62a is relatively low, and therefore it can hold the necessary high air pressures notwithstanding the relatively high speed at which the drum rotates. The spacial arrangement of the hub 36 to be mounted on the two bearings systems 40 and 33 and 34 makes possible the establishment of an air passageway between 62 and 50.

The controls for actuating the clutches and the throttle are provided, one for each drum 83 and 83a (see Fig. 1), and are positioned adjacent the drums 19 and 15 and mounted upon one side of the housing 82' which encloses the drums and the frame. The controls (see Figs. 5 and 7) are mounted inside of box 83 mounted on the side of the cover 82'. Mounted in the top 84 of the box 82 is a lever 85 mounted on said top on a ball and socket universal joint 86. The extension 87 of the rod 85 is connected to a yoke 88 carrying a fork 89. Between the tines of the fork 89 is a stem 90' which actuates the air valve 90 shown in section in Fig. 7. While any valve for the purpose may be employed, the valve shown in Fig. 7, the construction of which forms no part of this invention, may be adapted for use in my control mechanism.

Figure 7:
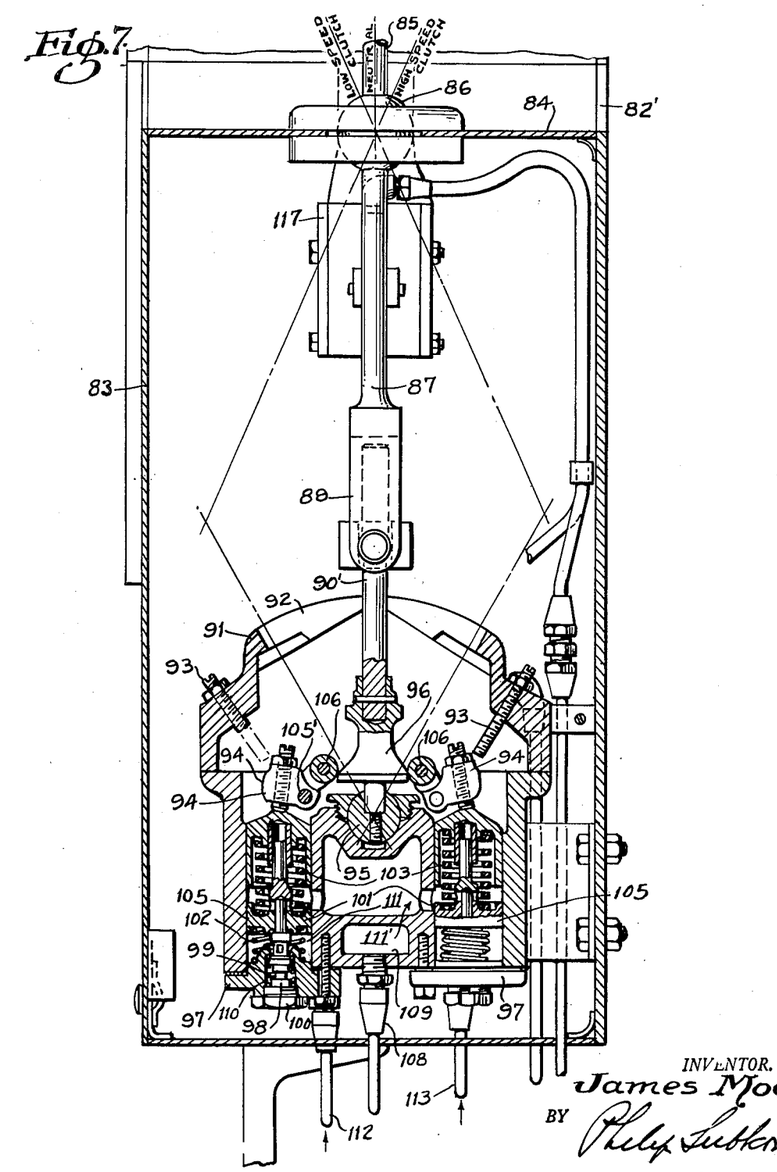
Fig. 7 is a section taken on line 7—7 of Fig. 5.

The valve consists of a body 91 containing the operating parts which also serve as a mounting and pipe bracket. Mounted in the body 91 are set screws 93 which act to control the limit of motion of the valve rockers 94 about their pivot 105' actuated by the cam surface 96 and cam roller 106. The opening 92 permits of a 360° movement of the rod 90' on the ball and socket joint 95. The cover 97 carries a valve assembly, one on each side similarly constructed. The valve 98 and its valve spring 99 are held in place by the valve cap 100. The piston 101, acting against spring 103, and the spring 102 are also mounted thereon. The bottom of the piston 101 provides a seat for the valve 98. The spring 102 holds the piston seat away from the valve 98.

The valves 98 and 105 control the flow of air supply and its delivery and are urged to their seated position by the springs 99. Air inlet 108 is connected through chamber 109 and by ports, not shown in the section Fig. 7, to the spaces 110 and 111'. Air pressure delivery pipes 112 and 113, one on each of the two valves, connect to space 111 through ducts, not shown in the drawing. Air pressure is vented from the valve through chamber 111' to the atmosphere.

Figure 8:
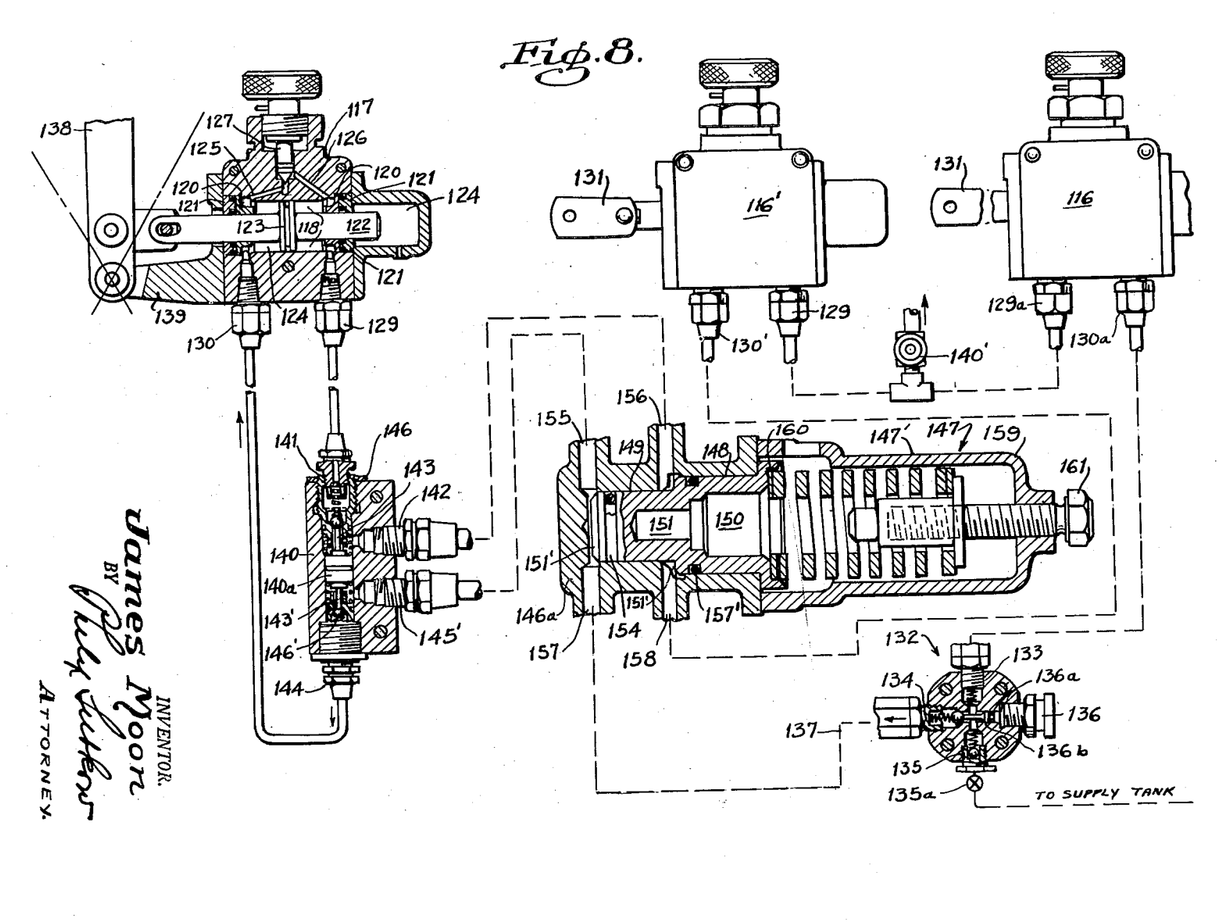
Fig. 8 is a view in part section and partly schematic, showing the construction of various control mechanisms and their interconnection.

Mounted upon a bracket 114 and a pivot 115 is swingably mounted valve and a pressure transmitting mechanism 116, the construction of which is shown in greater detail in Fig. 8. The axis of the hinge 115 is parallel to the tines of the fork 89. The construction of 116 is similar to the unit 117 which is shown in section in Fig. 8. The difference rests in the method of connecting the rod to the actuating mechanism, as will be described hereinafter. The description of the mechanism 117 will therefore be equally applicable to valve 116.

A cylindrical bore 118 is provided in the unit and the bore is closed at both ends by stop 120 which is mounted upon a suitable gasket seal packing gland 121. Piston rod 122 passes through the packing gland 121 at both ends of the cylinder and carries a piston 123 suitably sealed against the cylindrical wall 118. One end of the piston rod projects into a vented chamber 124 and the other end is connected to the actuating mechanism, as will be described below. Both ends of the cylinder 118, on either side of the piston 123, are interconnected by means of bores 125 and 126 and needle valve 127. Both ends of the cylinder 118, on either side of the piston 123, are connected to outlet ports shown in valve 117 as 130 and 129 and the corresponding one in 116 to 129a and 130a, respectively.

Mounted also in box 83 is a charging valve 132 shown in section in Fig. 8. The body of the valve is bored with four bores. Bore 133 is connected to line 130a; bore 135 carries a check valve and is connected to a supply tank, and bore 134 also carries a check valve and is connected to line 137, as shown in Fig. 8. In bore 136a, axially aligned with bore 134, is a screw plug 136 carrying a rod 136b, so positioned that on screwing in the plug 136, the rod 136b will unseat the ball of the check valve in bore 134.

Figures 5, 6:
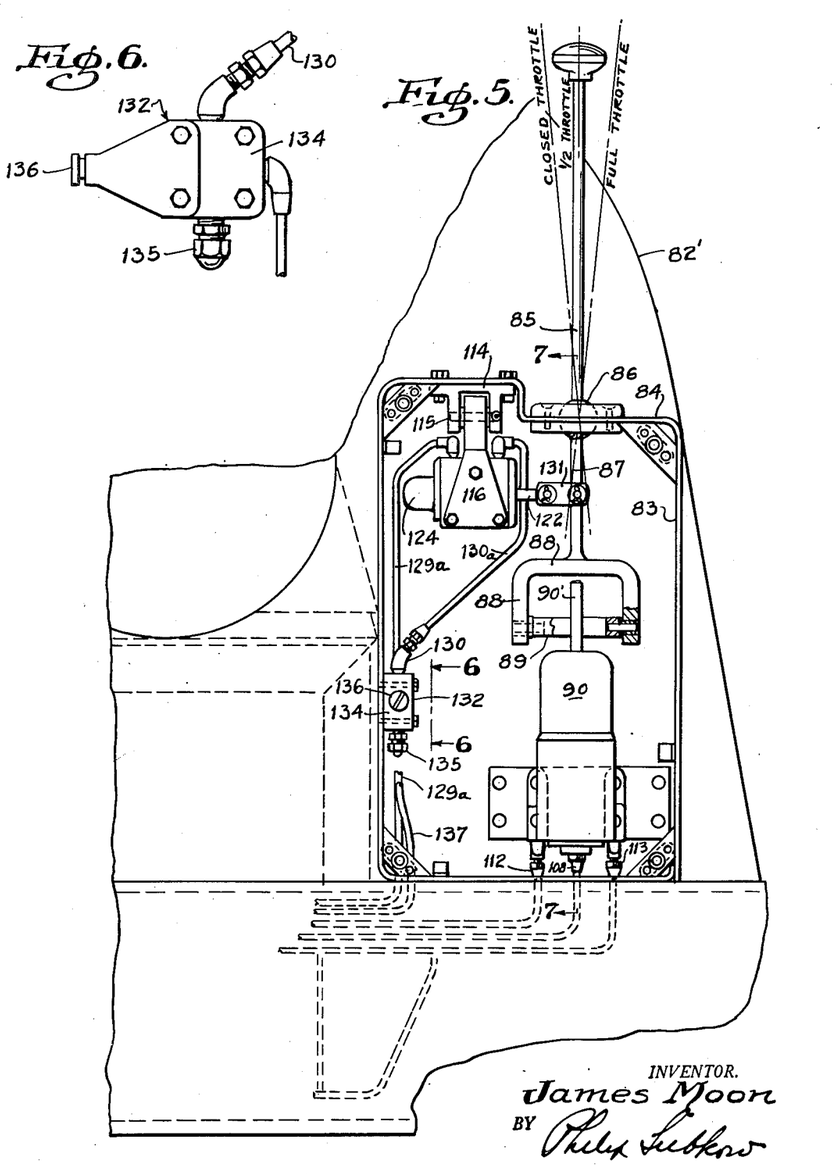
Fig. 5 is a detail in part section of the control mechanism positioned at drum position, showing the cover of the control box removed to illustrate the mechanism.
Fig. 6 is a section taken on line 6—6 of Fig. 5.

As shown in Fig. 5, the rod 122 is connected at the end opposite the housing 124 through a link 131 to the rod 87. Positioned also adjacent drum 15, see Fig. 1, is a box 83a containing the same mechanism as shown in Fig. 5 and described as positioned adjacent drum 19 but with the following differences. Since drum 15 has but one air clutch which is actuated via air line 113 to line 63a similar to 63 and the rotor connector 62' similar to 62 on the air clutch, line 112' corresponding to 112 may be vented to the air. Additionally, instead of valve 116, a valve 116' is constructed and mounted in a manner similar to 116 and connected to outlets 130' similar to 130a and outlet 129' similar to outlet 129a. There is no valve similar to 132 mounted in box 83a, line 130' being connected to the pressure regulator as shown in Fig. 8 and which will be described hereafter. The lines 129a and 129' of the mechanism 116 and 116' are connected to the valved outlet 140' which is in turn connected to the supply tank from which the supply from 135 and charging valve 132 is also connected.

The mechanism 117, shown in Fig. 8, is mounted upon the internal combustion engine 2 and is modified to have a bracket 139 upon which is pivotally mounted the arm 138 which is connected to piston rod 122. The rod 138 is connected for actuation of the throttle of the engine. Outlet 130 similar to 130' and the outlet 129 similar to 129' are connected to ports 141 and 144 of the double check valve 140. The outlets from the corresponding check valve shown at 142 and 145', see Fig. 8, are connected respectively, as will be described hereafter, to the pressure control mechanism. The housing of 140 carries a cylindrical bore in which is slidably positioned a piston 140a carrying piston rods 143 and 143' on which ride ball check valves 146 and 146'.

The pressure control mechanism shown in Fig. 8 is composed of a housing 147' carrying the bores 148 and 149 in which is fitted the stepped piston 150 and 151 suitably sealed by O ring 157' against the bore 148 and by O ring 154 against the bore 149. Suitable end closure is provided as shown at 146a and ports 155 and 157 are connected to the space at one end of the piston 149 and ports 158 and 156 are connected to the space at the end 151' of the stepped piston 151. The back of the piston acts as a shoulder 160 for spring in housing 159. The compression of the spring is controlled by the stud 161 which shoulders on the spring. The ports 155 and 156 are connected at 145' and 142 respectively, the port 157 is connected to line 137, and the ports 158 are connected to line 130'.

Figure 9:
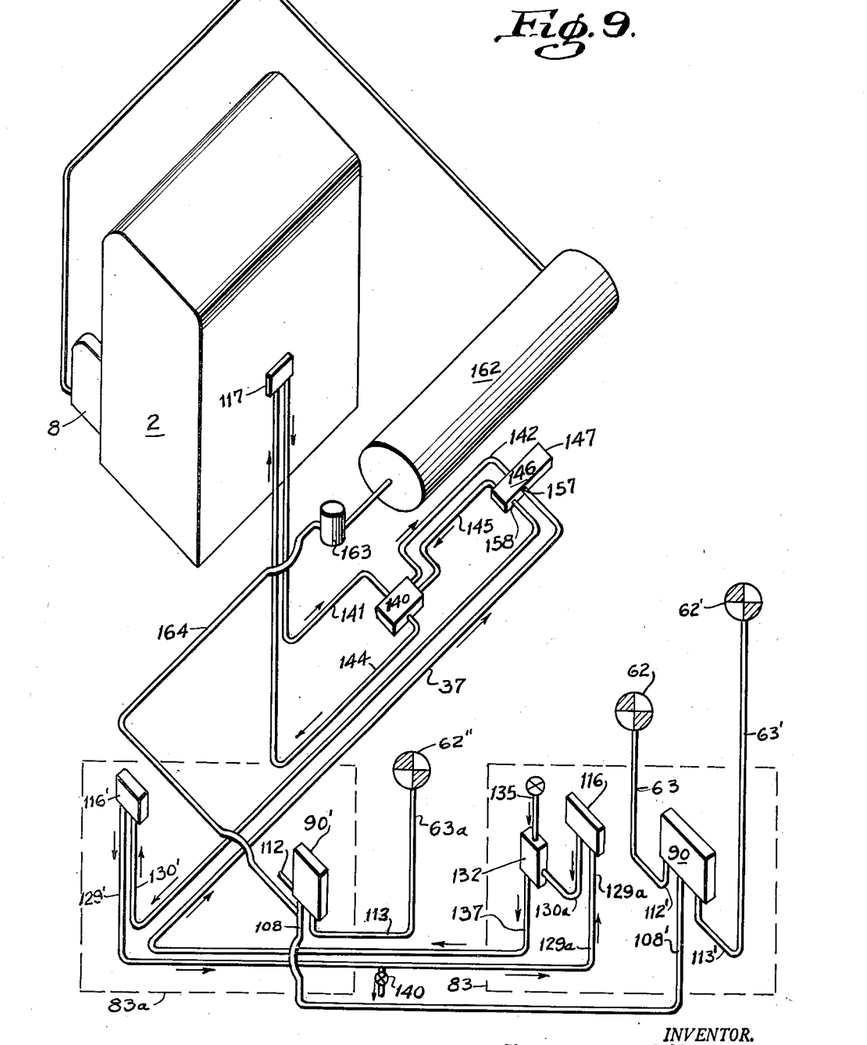
Fig. 9 is a schematic diagram showing the relative connections of the various parts of the control mechanism.

As will be observed from Fig. 9, the air supply to lines 108 and 108', respectively, on the air control valves shown in Fig. 7, and mounted in the control station 83 and 83a, comes from a tank 162 through air filter 163 and line 164, the air tank being supplied by the compressor 8. The supply lines 112 and 113 from the valve 90 on the control mechanism 83 passes to each of the rotor connectors 62 and 62', respectively, on each end of the drum 19. In the case of the drum 15, as illustrated, only one air clutch is employed, since only one speed is obtained and the valve mechanism 90' employs only one of the two valve mechanisms, as, for example, one having the supply line 113', while the other line 112' is vented to atmosphere.

The operation of the device and the control mechanism will be clear from what has been described above. In order to fill the hydraulic control system, shown in Fig. 8, with fluid, with the plug 136 retracted to remove 136b from the ball check valve 134, oil under pressure is supplied from a storage tank, not shown, through line 135, unseating valve in 135 and the check valve in 134. Oil is thus circulated through lines 130a and 137. The oil from 137 passes through the ports 157 and around the annular space at the end of the piston 149 into line 155 through 145', unseating the check valve in 143', lifting the piston 140a and thus unseating ball 146', and passing through port 144 into 130 and through ports 125, valve 127 being open, through ports 126, into port 129, through port 141, and on unseating the check valve in 143 passes through line 142 into port 156. It then is circulated through 156 and 158 into line 130' and through unit 116' similarly to the manner of 117, the valve 127 being open in 116' out of 129', and discharges through line 140', the valve being open, into the supply tank. Simultaneously the oil circulates through port 133 and line 133a through unit 116 in the same manner as through 117, valve 127 in 116 being open, and discharges through line 129a through the valved line 140' into the tank. When the unit is filled, valve on 140' is closed as well as the valve 135a on the inlet to valve 132. The check valves in 134 and 135 seat to close the ports. The plug 136 is screwed, thus unseating the check valve 134, check valve in 135 being thus also seated. The pressure in the filled system is now adjusted by adjusting the screw 161 which adjusts the tension of spring 160 and therefore the compression of the piston 150 and 151 and their corresponding cylinders, thus adjusting the pressure uniformly across the whole system which is thus air free. The valves 127 in lines 116, 116', and 117 are closed by screwing in the needle valve.

It will be observed that there are two interlocking controls mounted in the box 83, see Figs. 5, 6, and 7.

Referring to Fig. 5 it will be observed that the movement of the rod 85 in the plane shown in Fig. 5 will cause an in-and-out motion of the piston rod 122 (see Fig. 8) in unit 116 or 116' without actuating the rod 90', for the fork 89 moves over the rod 90' in this condition without affecting the rod 90'. It will also be observed that when the rod is moved in the plane of Fig. 7, i. e., between the high and low positions shown in Fig. 7, the rod 90' is actuated without actuating the piston rod 122, as long as the rod 85 is in the neutral position shown in Fig. 7, since the units 116 and 116' pivot on 115 when the rod is moved, as described above.

It will, however, be observed that at any position of the rod 85 between the high and low positions (Fig. 7) the rod is also actuable in a direction perpendicular to the plane of Fig. 7, i. e., in the plane of Fig. 5 or parallel thereto, to move the rod between closed throttle and full throttle position. It is thus possible to actuate the rod 90' and the rod 122 independently as well as conjointly in any degree to obtain any degree of movement of the piston rod 122 and any degree of movement of the rod 90' at any position of rod 85 to move the throttle and actuate the clutches either independently or conjointly.

Coming now to the action of the rod 85 in the plane of Fig. 5, it will be observed as the rod is moved to the right, as Fig. 5 is viewed, the piston in 116 is moved to the right, as Fig. 8 is viewed, thus forcing fluid out of line 130a. Fluid passes through the valve 132, port 134, and 137, through the pressure regulator and lines 155, through lines 145', valve 146', floating piston 140a to unseat valve 146', passes via line 144, line 130 exerting pressure on 123 to move the piston to the right, the oil discharging from the opposite side of the piston through 129, line 141, valve 146, line 142, through port 156 and port 158 into line 130', moving the piston in 116' to the right, the oil discharging from the right-hand side of the piston 123, in unit 116', through line 129', and returning through 129a into the left-hand side of the piston 116. When the piston 123 moves a distance equal to that in 116 (all units being alike) a pressure equilibrium is established on each side of the piston in 140a and the springs against which it acts to bring it to neutral position, thus permitting the valves 146 and 146' to seat.

It will thus be observed that upon the movement of piston 116 which acts as the master cylinder, piston in 116' and the piston in 117 move in exactly the same degree as slave cylinders because the same amount of oil is displaced. This causes a movement of the throttle arm 138 which moves the throttle toward closed position. The degree of movement of the rod 85 from the vertical neutral position, which corresponds to half throttle, to its full movement to the right, which corresponds to full open throttle, or to the extreme position to the left corresponding to full closed, will open and close the throttle in the desired degree.

It will be observed that at the two control positions of drums 15 and 19 the rods 85 move in unison and therefore the throttle can be actuated from either position. It will also be observed that during this motion the rod 90' has not been actuated, since, as has been explained, the tines of the fork move about 90' without affecting it when the rod is moved in the plane of Fig. 5.

When the rod 90' is moved either to the right or left, by motion of the rod 87 in the plane of Fig. 7, the movement of the rod 90' compresses the spring 103 in either of the two valves and forces the piston 101 downward, seating the valve 105 and unseating the lower valve 98. This closes the exhaust port and opens the supply port and air builds up underneath the piston 101 until pressure slightly higher than the spring pressure is attained. The pistons then assume a balanced position in which both valves are closed. Further lever movement to increase compression of the spring upsets the balance and causes the repetition of the piston movement to again balance at a higher pressure. The reverse lever movement relieves the spring compression and results in an upward movement of the piston which closes the supply valve and opens the exhaust port, thereby cutting off the air supply and reducing the air pressure under the piston. The movement of the rod 90' is transferred to the spring 103 through the cam surface 96, the rocker 94 and roller 106. The piston 101 thus moves downward and the exhaust port is sealed. The valve 98 moves away from its seat so that supply pressure is permitted to pass into the chamber 111 and therefrom into line 112 or 113, depending upon which side is actuated. If the operating lever 90' is moved back to neutral the air pressure built up in the chamber 111 lifts the piston 101 thereby removing the force acting on the valve 98 and the spring 102 lifts the valve assembly seating the supply valve and preventing further flow of the supply air past this valve. The upward movement of the piston 101 also pulls the exhaust valve seat away from the valve, opening the chamber under the piston to the exhaust so that accumulated pressure in this chamber and the delivery passage is vented to atmosphere. The application of pressure or the release of pressure is graduated evenly in proportion to the pressure applied to spring 103 and which is in turn controlled by the position of the operating lever. Due to the balanced forces established between the air pressure and the spring pressure, the air delivery pressure will at all times correspond to the force exerted on the spring 103. When balance is established air pressure is high enough to compress the spring 103 and raise the piston 101 enough to permit the seating of the supply valve but not enough to unseat the exhaust valve. Therefore delivery pressure is held constant until the pressure on the graduating spring 102 is changed. If pressure on the spring is increased the operation is repeated and a balance is established at a higher pressure. If pressure on the spring is decreased delivery pressure lifts the piston 101 unseating the exhaust valve and venting air to atmosphere until a lower balanced pressure is established.

In this way pressure may be transmitted either through lines 112 or 113 and the degree of pressure determined by the position of the lever to the right or left of the vertical neutral position from a low pressure to the neutral position to its maximum pressure at the extreme right-hand or left-hand position of the lever in the plane of Fig. 7.

Referring now to Figs. 1, 2, and 3, it will be observed that the actuation of the valve 90 by movement of the lever 85 to either the right or the left will cause pressure to be exerted through lines 112 and 113 at either the clutch A or clutch B of drum 19, as the case may be, or upon clutch on the drum 15. It will also be observed that, depending upon the angular degree of position of the lever to the right or left of its neutral position determines the degree of pressure exerted in 52 and will determine the degree of pressure with which the clutch facing 55 is compressed against the clutch facing 56, and thus will determine either the full engagement of the clutch A or B or the degree of slippage of the clutch. It will also be observed that either A or B may be engaged in full or slipping conditions but not both at the same time. In other words, if there is any degree of engagement of clutch A, clutch B is free, or if any degree of engagement of B, clutch A is free.

It will also be observed that by moving the lever to the right or left in Fig. 7 either clutch A or clutch B can thus engage and at the same time by moving the piston to the left or the right in a plane parallel to Fig. 5, the throttle may be opened to any degree desired. It is thus possible with this arrangement to get any degree of clutch with any degree of throttle or any degree of throttle with any degree of clutch.

For example, in operating this device upon a drilling equipment when the load of the drilling pipe is to be raised the valve, as shown in Fig. 7, is actuated to give full clutch on the low speed side of the drum with full throttle. As the load is lifted and momentum and speed have been attained, by throwing the lever 90' to the other side of neutral, the high speed clutch can be engaged without any loss of momentum. The load is transferred immediately from the low speed side to the high speed side and the load is raised at high speed. When the momentum has been reached it may be desirable to close the throttle in order to give part throttle operation to prevent the load from being raised too fast and this may be done while the high speed clutch is engaged. Should it be desired then to slow down the load, the clutch may be slipped while part throttle condition can also be adjusted to lower throttle position. In other words, the air pressure on the high speed clutch 62' may be reduced to produce part slippage and the throttle partially closed by simultaneous movement of the lever in the plane of 7 and in the plane of 5.

In fishing operations, wherein lost or broken off pipe and tools (known as "fish" in this art) must be recovered by a grapple or other types of "fishing tools," it is desirable to run the fishing tool into the hole at the end pipe or line at a high rate of speed, and on reaching the fish a very light touch and slow rate of movement of the fishing is required in order to feel for the fish. Upon recovery of the fish by the fishing tool, it is desirable to retrieve the fish at a high rate of speed. This is advantageously and simply accomplished by my controlled hoisting drum assembly. The lever is moved to neutral position and fishing tool runs in free fall, all clutches unengaged, under control of the brake. When the position of the fish is approached, the lever is moved to engage the clutch on either the high or low speed side, depending on the weight of the pipe and fish and sufficient to allow the weight to cause the clutch to slip, at the same time a small amount of throttle is applied by a simple movement of the control handle. The clutch is slipped in stages by reducing the pressure in the clutch tube by movement of the handle toward neutral position with, if desired, a simultaneous reduction in opening of the throttle. When the fish is engaged, full clutch on either the high or low speed side (depending on the weight) and full throttle is simultaneously applied by a single movement of the control handle.

In jarring operations, particularly upward jarring, it is desirable to cause the jarring tool to accelerate at maximum velocity before the jars engage in order to obtain the maximum inertial impact. Because of the flexibility of my control which permits any degree of throttle operation for any degree of clutch, I can first speed up the engine power plant with clutches disengaged and when the engine is operating at high speed I can then instantly apply full clutch on either the high or low speed side while maintaining the throttle in full open position. This makes possible most efficient jarring operations.

While this control is described as applicable to a drum hoist powered by an internal combustion engine, and described as operating the throttle thereof to control the power output and speed of the engine, it will be clear to those skilled in this art that instead of employing an internal combustion engine (diesel or spark ignition type) I may use any type of power unit. Thus, I may employ a steam engine and connect the slave unit to the steam valve to close and open the valve in the same manner as described for the throttle. I may also employ a torque converter or hydraulic speed changing transmission and control the slip thereof by connecting the necessary valves to the slave. Similar and other equivalent uses may be made of my invention employing the principles of my invention as set forth above.

While I have described a particular embodiment of my invention for the purpose of illustration, it should be understood that various modifications and adaptations thereof may be made within the spirit of the invention as set forth in the appended claims.

I claim:

1. A combination throttle and clutch control for a clutch linked shaft, a fluid line, means for connection of said line to a source of pressure and to a fluid operated clutch, a valve in said line, a valve stem for closing and opening of said valve on motion of said valve stem, a lever mounted for universal movement on a universal hinge, a connection between said lever and said valve stem on one side of said hinge, said connection being inoperative to move said valve stem upon motion of said lever in one plane and operative to move said valve stem in planes angularly disposed to said first-named plane, a hingedly mounted cylinder, a piston in said cylinder, a link connection between said piston and said lever on the same side of said hinge, and fluid pressure lines connected to said cylinder on either side of said piston.

2. A control for powered fluid actuated clutch coupled hoist drum, a fluid line, means for connecting said line to a source of pressure and to said fluid operated clutch, a valve in said line, a valve stem for closing and opening of said valve on motion of said valve stem, a lever, a universal movement hinge, said lever mounted on said hinge for universal movement of said lever, a fork connected to said lever, said valve stem being movably positioned between the tines of said fork, a hinge for said cylinder, the axis of said cylinder hinge being parallel to the tines of said fork, a piston in said cylinder, a link connection between said piston and said lever, and fluid pressure lines connected to said cylinder on either side of said piston.

3. An internal combustion engine powered fluid clutch coupled hoist drum, comprising an internal combustion engine, a rotatably mounted drum, a power transmitting coupling between said drum and said engine, a fluid actuated clutch between said drum and said engine, a fluid line to said fluid actuated clutch, a valve in said line, a throttle link connected to the throttle of said internal combustion engine, a slave unit operatively connected to said link, a master unit, a lever, a universal hinge for said lever, said master unit being connected to said lever on one side of said hinge for bodily motion with said lever in one plane, a second operative connection on the same side of said hinge between said lever and said master unit operative on motion of the lever in a plane perpendicular to said first-named plane, an operative connection between said master unit and said slave unit, whereby said slave unit moves said throttle link responsive to the movement of said lever, and a connection between said valve and said lever on the same side of said hinge for opening and closing of said valve upon motion of said lever in said first-mentioned plane.

JAMES MOON.

REFERENCES CITED

The following references are of record in the file of this patent:

UNITED STATES PATENTS

| Number | Name | Date |
| --- | --- | --- |
| 1,711,896 | McLean | May 7, 1929 |
| 2,314,842 | Hedeman et al. | Mar. 23, 1943 |
| 2,329,742 | Bush et al. | Sept. 21, 1943 |
| 2,336,715 | Casler et al. | Dec. 14, 1943 |
| 2,388,357 | Hewitt | Nov. 6, 1945 |
| 2,395,180 | Good | Feb. 19, 1946 |
| 2,426,064 | Stevens | Aug. 19, 1947 |

FOREIGN PATENTS

| Number | Country | Date |
| --- | --- | --- |
| 569,136 | Great Britain | May 7, 1945 |